April 14, 1953   J. MORETTI   2,634,593
END MEMBER FOR BOX TYPE LINK CHAINS
Filed July 19, 1950

INVENTOR.
John Moretti
BY
Barlow & Barlow
ATTORNEY

Patented Apr. 14, 1953

2,634,593

UNITED STATES PATENT OFFICE 2,634,593

END MEMBER FOR BOX TYPE LINK CHAINS

John Moretti, Cranston, R. I.

Application July 19, 1950, Serial No. 174,719

3 Claims. (Cl. 63—4)

This invention relates to an end member for a box type link chain, which end member may serve any one of many functions.

It is usual to provide some special end connector or end member for connecting the ends of a chain together which is specially formed to perform a certain function. The tool operations are quite expensive for the formation of such an end link.

One of the objects of this invention is to provide a very simple form of end member which may be connected to a chain, such as a bracelet chain, for connecting the ends of the chain together or for other specific uses.

Another object of this invention is to provide an attachment for the end of a chain by utilizing the means by which the chain links are connected together.

Another object of this invention is to provide an end member in which the connecting means for the end of the chain is of a uniform standard formation but which may be provided at its other end in many different forms to serve many different purposes.

With these and other objects in view, the invention consists of certain novel features of construction, as will be more fully described and particularly pointed out in the appended claims.

In proceeding with this invention, I utilize the slot in the end wall of the box type link and the connector of the end box link to the next box for mounting a member in more or less rigid relation with the end of the chain and which may be provided with a connecting means for connecting the chain as a bracelet or may be utilized as a pendant ornament of different size or for attaching two lengths of chain to a single length all in parallel relation.

Figure 1:
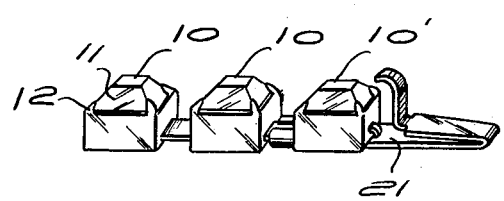
Figure 1 is a perspective view of three box links connected together with an end member embodying my invention attached to the end thereof.
Figure 2:
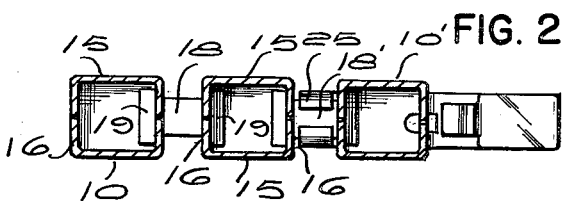
Figure 2 is a sectional view looking on top of the links shown in Figure 1.
Figure 3:
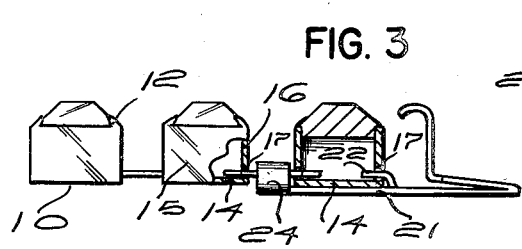
Figure 3 is an elevation partly in section of the structure heretofore mentioned.

With reference to the drawings, 10 designates a box type link in which a gem 11 may be positioned and held by prongs 12. This box type link, as shown in Figures 2 and 3, has a bottom wall 14, side walls 15, and end walls 16. These end walls are each slotted as at 17 and normally receive a connector 18 having heads 19 extending through the end walls 16 with the heads of a width greater than the width of the slot 17 so that the connector 18 will hold the box links 10 in assembled link relation. The connector is sufficient loose in the slot so that flexibility is provided.

Figure 4:
Figure 4 is a perspective view of the end member shown in Figures 1–3.

The end link of this chain is designated 10' and the end connector 18', and these serve as a means for mounting the member, which is the subject of this invention. The end member is designated generally 20 and is formed of sheet stock having a body 21 of elongated shape from which there is a tongue 22 raised from the stock thereof leaving an opening 23. Arms 24, 24 at the end of this body are provided as shown in Figure 4. This body is assembled with the end link by positioning the body 21 against the bottom wall 14 of the end link with the tongue 22 extending through the slot 17. The body is of such an extent that when the tongue is in this slot 17, the arms 24 are beneath the connector 18'. The arms 24 are then bent inwardly as at 25 about the connector so as to embrace it and hold the end membber assembled on the end of the chain.

Figure 6:
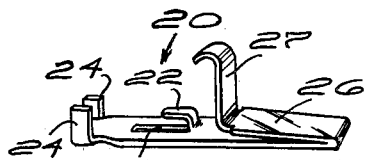
Figure 6 is a perspective view of a still different modified form of end member.

At the opposite end of the body 21 of the end member, from the position of the arms 24, I provide, as shown in Figures 1 to 4, a latch by means of a returned bend 26 having a handle portion 27. This latch may serve as a means for connecting the chain to a catch which may be mounted on a similar body member at the opposite end of the chain or in some instances, as shown in Figure 6, an eye 28 is provided on the end portion 29 of the body 21 for a different type of attachment.

Figure 5:
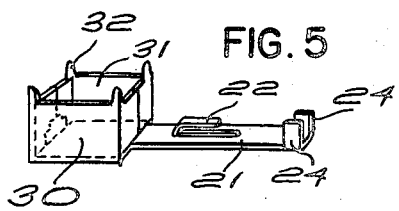
Figure 5 is a perspective view of a modified form of end member.
Figure 7:
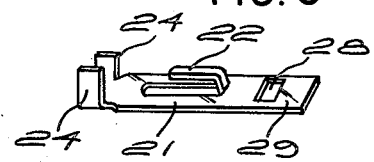
Figure 7 is a perspective view of a still different modified form of end member.
Figure 7:
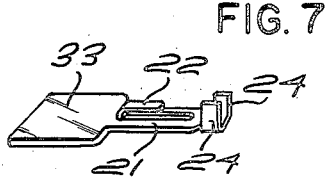

In other cases, as shown in Figure 5, the end of the body may be provided with an enlarged box setting 30 and may be attached to the end of a chain to serve as a pendant. Some jewel may be set into the hollow 31 of the box by prongs 32. In Figure 7 I have illustrated the body 21 as provided with a plain portion 33 to which some article may be soldered as desired.

Figure 8:
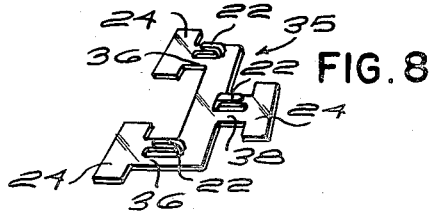
Figure 8 is a perspective view of an end member used for connecting two lengths of chain on one of its sides to one length of chain on the other side.

In Figure 8 I have illustrated an end member 35 which has two bodies 36 attached together by a bar 37 so that two lengths of chain may be attached by arms 24 on one side of the crossbar 37, while the body 38 is formed on the other side of this crossbar 37 for connection to a single length of chain with all of the lengths of chain extending in generally parallel relation. From the above it will appear that the invention is in the body and its connection to the end of the chain, while various parts may be provided on the end member to serve various functions.

I claim:

1. An article of jewelry comprising a plurality of spaced box-like links each having a bottom and end walls at right angles thereto with a slot in its end walls, a connector between adjacent links and extending across said space into the slots of adjacent walls, an end member for the end link of said article having an elongated flat body to engage the bottom wall of the said link and extend beneath the connector of said link, a tongue provided on the said body extending parallel thereto into the slot of the outer end wall of said link and an arm on said body extending laterally thereof in the plane of the body at the location of the connector, said arm being wrapped laterally about the connector and between the end walls of adjacent links to secure the end member in position.

2. An end member as in claim 1 wherein the tongue is lifted out of the stock of the body.

3. An end member as in claim 1 wherein a pair of arms embrace the connector.

JOHN MORETTI.

References Cited in the file of this patent

UNITED STATES PATENTS

| Number | Name | Date |
|---|---|---|
| 192,477 | Wright | June 26, 1877 |
| 352,917 | Granbery | Nov. 23, 1886 |
| 812,661 | Luckhaupt | Feb. 13, 1906 |
| 1,388,495 | Vilandeer | Aug. 23, 1921 |
| 1,481,894 | Fishel | Jan. 29, 1924 |
| 1,813,963 | Schick | July 14, 1931 |
| 1,957,141 | Jordan | May 1, 1934 |
| 2,222,410 | Grassmann | Nov. 19, 1940 |